(12) United States Patent
Kawaguchi et al.

(10) Patent No.: US 9,563,041 B2
(45) Date of Patent: Feb. 7, 2017

(54) OPTICAL SYSTEM FOR AN INFRARED RAY

(71) Applicant: Tamron Co., Ltd., Saitama-shi (JP)

(72) Inventors: Koji Kawaguchi, Saitama (JP); Yuko Watanabe, Saitama (JP); Shingo Fuse, Saitama (JP); Xiang Yu, Saitama (JP)

(73) Assignee: Tamron Co., Ltd, Saitama (JP)

( * ) Notice: Subject to any disclaimer, the term of this patent is extended or adjusted under 35 U.S.C. 154(b) by 0 days.

(21) Appl. No.: 14/488,777

(22) Filed: Sep. 17, 2014

(65) Prior Publication Data

US 2015/0085353 A1    Mar. 26, 2015

(30) Foreign Application Priority Data

Sep. 20, 2013 (JP) .................................. 2013-195809

(51) Int. Cl.
*G02B 13/14*    (2006.01)
*G02B 13/04*    (2006.01)
*G02B 9/10*     (2006.01)

(52) U.S. Cl.
CPC .............. *G02B 13/14* (2013.01); *G02B 13/04* (2013.01); *G02B 9/10* (2013.01)

(58) Field of Classification Search
CPC .............. G02B 1/00; G02B 3/00; G02B 3/02; G02B 9/10; G02B 13/04; G02B 13/14

USPC ................................ 359/350–361, 717, 793
See application file for complete search history.

(56) References Cited

U.S. PATENT DOCUMENTS

2012/0229892 A1*  9/2012  Kang et al. ................... 359/356
2013/0182316 A1   7/2013  Fuse

FOREIGN PATENT DOCUMENTS

| CN | 103207445 A  | 7/2013  |
| JP | 2010113191 A | 5/2010  |
| JP | 2011253006 A | 12/2011 |

* cited by examiner

*Primary Examiner* — Bumsuk Won
*Assistant Examiner* — Wen Huang
(74) *Attorney, Agent, or Firm* — The Webb Law Firm

(57) ABSTRACT

An object of the present invention is to provide an optical system for an infrared ray which can provide a bright image, and can be applied to fixed focal length lenses among wide-angle to medium-telephoto. To achieve the object, the optical system for an infrared ray is constituted by a first lens having negative refractive power and a second lens having positive refractive power, these are arranged sequentially from an object side, wherein both the first lens and the second lens are made of an infrared transmitting material that transmits a light beam in an infrared wavelength range of 3 micron-meters or more to 14 micron-meters or less, and at least one of the lenses is made of an infrared transmitting material excluding germanium.

3 Claims, 11 Drawing Sheets

Spherical Aberration    Astigmatic Aberration    Distortion

OPTICAL SYSTEM FOR AN INFRARED RAY

CROSS-REFERENCE TO RELATED APPLICATION

This application claims priority to Japanese Patent Application No. 2013-195809 filed Sep. 20, 2013, the disclosure of which is hereby incorporated in its entirety by reference.

BACKGROUND OF THE INVENTION

Technical Field

The present invention relates to an optical system for an infrared ray used in an infrared wavelength range.

Background Art

Conventionally, optical systems for an infrared ray are used for analysis of heat distribution of an object in medical and industrial fields in addition to surveillance and personal authentication. In recent years, applications of optical systems with an infrared ray have spreading into onboard cameras, and are also spreading into various applications not only surveillance, travel record and driving support but also detection of pedestrians and obstacles at night. With increasing in the applications of the optical systems for an infrared ray, a fixed focal length lens having a small F-number which can provide a bright image has been demanded rather than a zoom lens with a variable focal length.

The optical system for an infrared ray is generally constituted by a combined plurality of lenses made of infrared transmitting materials including germanium having a high refractive index for an infrared ray. For example, Patent Document 1 discloses a wide-angle optical system for an infrared ray constituted by a first lens composed of a meniscus lens whose convex surface faces an object side, and a second lens and a third lens composed of positive meniscus lenses whose convex surfaces face the object side these are arranged sequentially from the object side. Patent Document 2 discloses a bright optical system for an infrared ray constituted by a first lens composed of a positive meniscus lens whose convex surface faces an object side, and a second lens composed of a positive meniscus lens whose convex surface faces an imaging side these are arranged sequentially from the object side and has a small F-number.

DOCUMENTS CITED

Patent Documents

Patent Document 1: Japanese Patent Laid-Open No. 2011-253006
Patent Document 2: Japanese Patent Laid-Open No. 2010-113191

SUMMARY OF THE INVENTION

Problems to be Solved

However, the infrared transmitting lenses constituting the optical system for an infrared ray have high infrared absorptivity as compared to the visible-light absorptivity of lenses for visible-light, and their surfaces have high reflectance. So, as the number of lenses constituting the optical system for an infrared ray increases, absorption/reflection of infrared rays at the lens increases, and infrared transmittance in the entire optical system for an infrared ray reduces. That is, although the optical system for an infrared ray disclosed in Patent Document 1 employs wide-angle fixed focal length lenses having good imaging performance, as the number of lenses is larger than that of the optical system for an infrared ray disclosed in Patent Document 2, it is difficult to provide a bright image. On the other hand, the optical system for an infrared ray disclosed in Patent Document 2 is advantageous in providing a bright image since the optical system for an infrared ray is constituted by the two lenses. However, the optical system for an infrared ray is difficult to apply to a wide-angle lens since the convex positive meniscus lens is employed as the first lens and is suitable for normal to telephoto lenses. Also, as the large lens diameter of the first lens is required to achieve wide angle in such lens configuration, the imaging performance is made poor since comatic aberration increases and sufficient aberration correction is hard to achieve by the two lenses.

An object of the present invention is to provide an optical system for an infrared ray which can provide a bright image, and can be applied to fixed focal length lenses among wide-angle to medium-telephoto.

Means to Solve the Problem

As a result of diligent study, the present inventors have achieved the object by employing an optical system for an infrared ray described below.

An optical system for an infrared ray according to the present invention is constituted by a first lens having negative refractive power and a second lens having positive refractive power, these are arranged sequentially from an object side, wherein both the first lens and the second lens are made of an infrared transmitting material that transmits a light beam in an infrared wavelength range of 3 micronmeters or more to 14 micron-meters or less, and at least one of the lenses is made of an infrared transmitting material excluding germanium.

The optical system for an infrared ray according to the present invention is preferable to satisfy the following expression (1):

$$f_1/f < -1.0 \qquad (1)$$

where $f_1$ is a focal length of the first lens and f is a focal length of the entire optical system for an infrared ray.

The optical system for an infrared ray according to the present invention is preferable to satisfy the following expression (2):

$$0.35 < f_2/f < 5.5 \qquad (2)$$

where $f_2$ is a focal length of the second lens and f is a focal length of the entire optical system for an infrared ray.

The optical system for an infrared ray according to the present invention is preferable to satisfy the following expression (3):

$$(f_2/f)/Fno < 5.6 \qquad (3)$$

where $f_2$ is the focal length of the second lens, f is the focal length of the entire optical system for an infrared ray, and Fno is an F-number of the entire optical system for an infrared ray.

Advantages of the Invention

According to the present invention, the optical system for an infrared ray can be provided which can provide a bright image, and can be applied to fixed focal length lenses among wide-angle to medium-telephoto.

DETAILED DESCRIPTION OF THE PREFERRED EMBODIMENT

Figure 1:
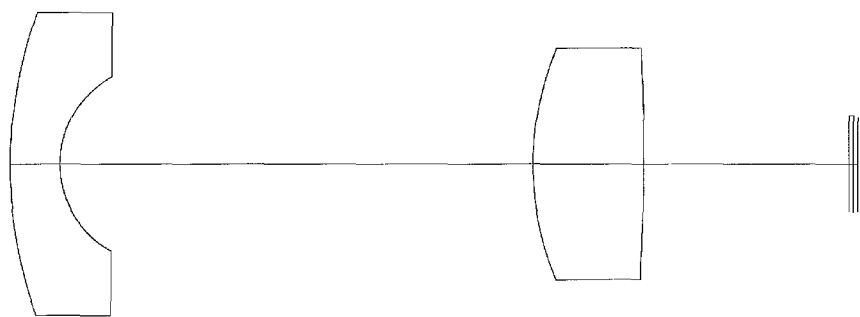
FIG. 1 shows an optical sectional view exemplifying a lens configuration of an optical system for an infrared ray (infrared lens having fixed focal length) in Example 1 of the present invention.

Embodiments of an optical system for an infrared ray according to the present invention will be described.
1. Optical System for an Infrared Ray
1-1. Lens Configuration A configuration of the optical system for an infrared ray according to the present invention will be described. The optical system for an infrared ray according to the present invention is constituted by a first lens having negative refractive power and a second lens having positive refractive power, these are arranged sequentially from an object side, both the first lens and the second lens are made of an infrared transmitting material that transmits a light beam in an infrared wavelength range of 3 micron-meters or more to 14 micron-meters or less, and at least one of the lenses is made of an infrared transmitting material excluding germanium.

In the optical system for an infrared ray according to the present invention constituted by the two lenses of the first lens and the second lens, number of lenses constituting the optical system is small. Infrared lenses have higher absorptivity and reflectance for infrared ray beams than lenses for visible-light. So, reduction of the number of lenses may reduce absorption and reflection of infrared rays in the entire optical system for an infrared ray and F-number of the entire optical system for an infrared ray is made small to provide a bright image. The image sensors (light-receiving sensors) are generally susceptible to thermal noise around the sensor and have low sensitivity since infrared image sensors electronically convert thermal energy of incident infrared rays.

However, the optical system for an infrared ray according to the present invention can provide a bright image with a low S/N ratio and good image quality since the F-number can be made small as described above.

Although the optical system for an infrared ray according to the present invention is constituted by the two lenses, as a negative lens having negative refractive power is employed as the first lens, comatic aberration and focus distortion is reduced, and further, spherical aberration generates in the first lens having negative refractive power can be corrected well by the second lens having positive refractive power. The first lens employing the negative lens may widen an image viewing angle easily. So, the optical system for an infrared ray according to the present invention can be easily applied to fixed focal length lenses having wide image viewing angle among medium-telephoto a wide angle.

Note that the shapes of the lenses are not particularly limited as long as the first lens is a negative lens having negative refractive power and the second lens is a positive lens having positive refractive power.

In the optical system for an infrared ray according to the present invention, both the first lens and the second lens are made of an infrared transmitting material that transmits a light beam in an infrared wavelength range of 3 micron-meters or more to 14 micron-meters or less, and at least one of the lenses is made of an infrared transmitting material excluding germanium. As lens processing on germanium lenses generally requires polishing or cutting, lens processing is difficult. So, employing of the infrared transmitting material excluding germanium as a lens material to produce at least one of the first lens and the second lens makes the lens processing easy as compared to a case which employs just the germanium lens. Particularly, the lens made of the infrared transmitting material excluding germanium is preferably employed for a lens having an aspherical surface among the first lens and the second lens.

The infrared transmitting material in the present invention is a material that transmits a light beam in the infrared wavelength range of 3 micron-meters or more to 14 micron-meters or less. Examples of the infrared transmitting material excluding germanium include chalcogenide, sapphire, ZnSe (zinc selenide), ZnS (zinc sulfide), and silicon. Employing of a material having high infrared transmittance reduces the F-number of the optical system for an infrared ray and provides an infrared image with a low S/N ratio and good image quality. As a glass material such as chalcogenide is moldable and generally less expensive than a crystal material such as germanium, the lens processing is made easy.

In the present invention, the lens made of the infrared transmitting material excluding germanium may be any one of the first lens and the second lens, or both of the lenses. In consideration of easiness of the lens processing, the lens made of the infrared transmitting material excluding germanium is preferably employed for the lens having an aspherical surface. Note that any one of the first lens and the second lens may be the germanium lens and the aspherical lens may be the germanium lens, i.e. it is not particularly limited. Among the infrared transmitting materials, germanium is high in refractive index for an infrared ray, and low in chromatic dispersion. So, the lens materials of the first lens and the second lens may be appropriately selected from germanium and the infrared transmitting materials excluding germanium depending on optical characteristics required for the optical system for an infrared ray.

In the optical system for an infrared ray according to the present invention, at least one surface of the first lens and the second lens is preferable to be an aspherical surface. As employing of the aspherical surface on at least one surface of the first lens and the second lens corrects spherical aberration and distortion aberration well, good imaging performance is achieved in the optical system for an infrared ray. In the present invention, it is more preferable to employ a plurality of aspherical surfaces to achieve better imaging performance by the two lenses.

1-2. Conditional Expression

Next, conditional expressions that the optical system for an infrared ray according to the present invention is preferable to satisfy will be described one by one.

1-2-1. Conditional Expression (1)

The optical system for an infrared ray according to the present invention is preferable to satisfy the following expression (1):

$$f_1/f < -1.0 \tag{1}$$

Where $f_1$ is a focal length of the first lens, and f is a focal length of the entire optical system for an infrared ray.

The conditional expression (1) defines the ratio between the focal length of the first lens and the focal length of the entire optical system for an infrared ray. If the value of the conditional expression (1) is less than the upper limit, spherical aberration can be kept in an appropriate range even using just the two lenses, and comatic aberration and focus distortion can be corrected well to make the optical system for an infrared ray good in imaging performance. On the other hand, if the value of the conditional expression (1) is equal to or more than the upper limit, all of spherical aberration, comatic aberration, and focus aberration increases to make correction of these difficult.

From the above point of view, the value of the conditional expression (1) is more preferable to be in a range of the following expression (1a):

$$f_1/f < -1.3 \tag{1a}$$

1-2-1. Conditional Expression (2)

The conditional expression (2) will be described. The optical system according to the present invention is preferable to satisfy the following conditional expression (2):

$$0.35 < f_2/f < 5.5 \tag{2}$$

Where $f_2$ is a focal length of the second lens, and f is a focal length of the entire optical system for an infrared ray.

The conditional expression (2) defines the ratio between the focal length of the second lens and the focal length of the entire optical system for an infrared ray. If the value of the conditional expression (2) is in the range, the refractive power of the second lens is in an appropriate range, and comatic aberration and focus distortion can be corrected well. If the value of the conditional expression (2) is equal to or less than the lower limit, as refractive power of the second lens group is weak and spherical aberration increases, the imaging performance is made poor when the optical system for an infrared ray is applied to a telephoto lens. If the value of the conditional expression (2) exceeds the upper limit, as the second lens is strong in refractive power and spherical aberration increases, the imaging performance is made poor when the optical system for an infrared ray is applied to a wide-angle lens.

If the infrared optical lens is applied to the wide-angle to medium-telephoto lenses, the value of the conditional expression (2) is more preferable to be in a range of the following expression (2a), from the point of view to provide better imaging performance:

$$0.4 < f_2/f < 5.3 \tag{2a}$$

1-2-2. Conditional Expression (3)

A conditional expression (3) will be described. The optical system for an infrared ray according to the present invention is preferable to satisfy the following conditional expression (3):

$$(f_2/f)/Fno < 5.6 \quad (3)$$

Where $f_2$ is a focal length of the second lens, f is a focal length of the entire optical system for an infrared ray, and Fno is an F-number of the entire optical system for an infrared ray.

The conditional expression (3) defines the ratio between the value of the conditional expression (2) and the F-number of the entire optical system for an infrared ray. If the value of the conditional expression (3) is in the range, aberration correction can be achieved well to provide a bright image. On the other hand, if the value of the conditional expression (3) is equal to or more than the upper limit, the aberration correction is made difficult due to an increased spherical aberration and comatic aberration.

From these point of view, the value of the conditional expression (3) is more preferable to be in a range of the following expression (3a):

$$(f_2/f)/Fno < 5.4 \quad (3a)$$

The value of the conditional expression (3) is preferable to be larger than 0 from the point of view to provide a brighter image.

1-3. Diffractive Optical Element Surface

In the optical system for an infrared ray, a diffractive optical element surface may be provided on at least one surface of the surfaces of the first lens and the second lens. As the lens materials (the infrared transmitting materials) of the optical system for an infrared ray may be larger in chromatic dispersion than that of a lens material for visible-light, chromatic aberration may increase. If the diffractive optical element surface is provided on the lens surface, chromatic aberration can be corrected well to provide an infrared image with good image quality.

As the optical system for an infrared ray according to the present invention described above can be applied to wide-angle to medium-telephoto infrared lens having fixed focal length with a wide image viewing angle of about 30° to 180°, a small F-number and an image with little noise can be provided. The optical system for an infrared ray can be applied to various applications such as surveillance cameras and infrared thermography, and is also suitable for a wide-angle fixed focal length lens.

The present invention will be specifically described with Examples. It should be noted that the present invention is not limited to the following Examples. The lens configurations described in Examples are merely exemplify the present invention, and the lens configuration of the optical system for an infrared ray according to the present invention may be arranged as appropriate without departing from the scope of the present invention.

Example 1

The examples of the optical system for an infrared ray according to the present invention will be described with reference to the drawings. FIG. 1 shows an optical sectional view exemplifying a lens configuration of an optical system for an infrared ray in Example 1.

As shown in FIG. 1, the optical system for an infrared ray in Example 1 comprises a first lens having negative refractive power and a second lens having positive refractive power, these are arranged sequentially from an object side, and is constituted by the two lenses. The first lens is a negative lens whose object-side surface is convex toward the object side, and the second lens is a positive lens whose object-side surface is convex toward the object side. The shapes of the lenses are shown in FIG. 1. Both the first lens and the second lens are made of ZnSe. A cover glass made of germanium is also arranged at closest to a focusing plane (the object side).

In Example 1, Typical Numerical Values 1 applied specific numerical values on the lens data of the optical system for an infrared ray is shown in Table 1. The kinds of lens data shown in Table 1 is as follows. A radius of curvature (Ri) at face number (Si) of each lens, a surface to surface gap (a lens thickness or a gap between lens surfaces adjacent to each other on the optical axis (Di)), a refractive index, a material name, and a focal length of each lens are shown. If the lens surface is an aspherical surface, "AS" is noted to a column next to the surface number. If the lens surface is a diffractive optical element surface, "DOE" is noted to the column next to the surface number. If the lens surface is an aspherical surface, a paraxial radius of curvature is shown as the radius of curvature. As for the surface number, an object-side surface of the first lens is "1", a focusing plane-side surface of the first lens is "2", an object-side surface of the second lens is "3", a focusing plane-side surface of the second lens is "4", an object-side surface of the cover glass is "5", and a focusing plane-side surface of the cover glass is "6". The same applies on Tables 4, 7, 10, 13, 16, and 19. In Table 1, the values of refractive index with a light beam having a wavelength ($\lambda$) of 4 micron-meters are shown. In Tables 4, 7, 10, 13, 16, and 19, the values of refractive index with a light beam having a wavelength ($\lambda$) of 10 micron-meters are shown. Example 1 is an example relates to the optical system for an infrared ray used in a mid-infrared range, and Examples 2 to 7 are examples relates to the optical system for an infrared ray used in a far-infrared range.

TABLE 1

| Surface No. | | Radius of Curvature | Gap | Refractive Index | Lens Material |
|---|---|---|---|---|---|
| 1 | | 106.055 | 11.645 | 2.43316 | ZnSe |
| 2 | | 23.683 | 111.064 | | |
| 3 | DOE | 71.420 | 26.201 | 2.43316 | ZnSe |
| 4 | AS | −260.609 | 48.040 | | |
| 5 | | Infinity | 1 | 4.02506 | Ge |
| 6 | | Infinity | 1 | | |

As for the aspherical surface shown in Table 1, an aspherical surface coefficient when the shape is defined by an expression z below is shown in Table 2. In Table 2, "E-a" indicates "×10$^{-a}$". The same applies on Tables 5, 8, 11, 14, 17, and 20.

$$z = ch^2/[1+\{1-(1+k)c^2h^2\}^{1/2}] + A4h^4 + A6h^6 + A8h^8 + A10h^{10} \text{ and so on}$$

Where c is a radius of curvature (1/r), h is a distance from the optical axis, k is a conic constant, and A4, A6, A8, A10 and so on are aspherical surface coefficients of respective orders.

TABLE 2

| Aspherical Surface Coefficient | S4 |
|---|---|
| K | 0 |
| A2 | 1.905162E−6 |
| A4 | −1.756149E−09 |
| A6 | 1.040965E−12 |
| A8 | 2.043170E−16 |

The diffractive optical element surface will be described. The diffractive optical element surface is constituted by series of ring zones formed on a substrate surface having a serrate cross-sectional shape and pitch of rings corresponds to each optical path difference of an integer multiple wavelength $\lambda_0$ (lambda: a phase difference of $2\pi$) in an optical path difference function $\rho$(rho: h) distribution. So, the shape of the diffractive optical element surface is defined by an optical path difference function $\rho(h)$ below, and an expression that shows a milled amount (dZ) with respect to a reference surface where the diffractive optical element surface is provided. A diffractive surface coefficient of the diffractive optical element surface shown in Table 1 is shown in Table 3. The same applies on Tables 6, 9, 12, 15, 18, and 21.

(Optical Path Difference Function)

$\rho(h)=(P2\times h^2+P4\times h^4+P6\times h^6+P10\times h^{10})$

Where P2, P4 and so on are diffractive surface coefficients, and h is a radial distance.

(Milled Amount with Respect to a Substrate Surface)

$dZ(h)=1/(n-1)[p(h)]$

Where n is a refractive index of the substrate.

TABLE 3

| Diffractive Surface Coefficient | S3 |
|---|---|
| P2 | −1.7507761E−01 |
| P4 | −1.9997398E−04 |
| P6 | 1.1177896E−07 |
| P8 | 1.0243069E−09 |
| P10 | −1.0108657E−12 |

Table 22 shows the focal length (f), the F-number (Fno), and the image viewing angle (2ω) of the entire system, and the focal length of the first lens ($f_1$), the focal length of the second lens ($f_2$), and the values of the conditional expressions (1) to (3) in Example 1.

Figure 2:
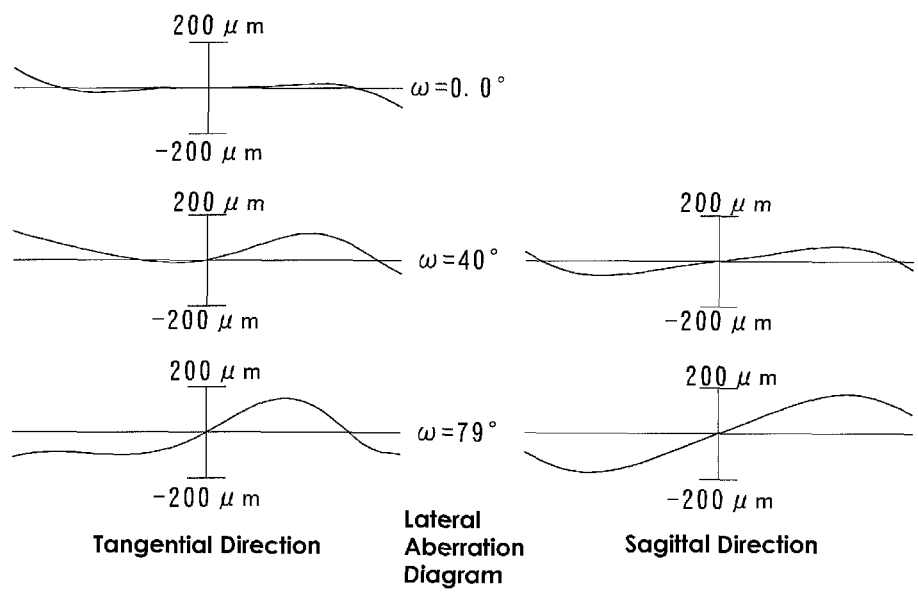
FIG. 2 shows a lateral aberration diagram in a tangential direction and a sagittal direction of the optical system for an infrared ray in Example 1 of the present invention showing characteristics at ω (omega: a half image viewing angle) of 0.0°, 40° and 79° sequentially from the top.
Figure 3:
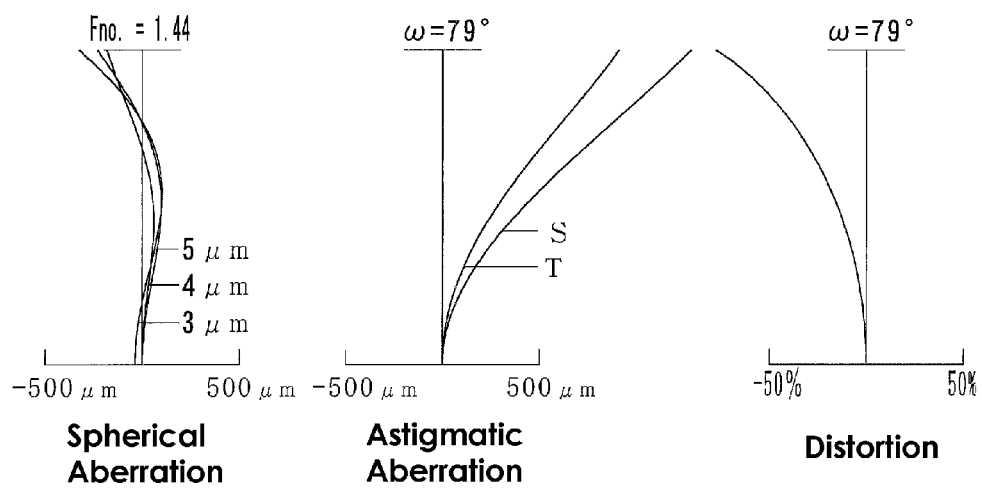
FIG. 3 shows aberration diagrams of the optical system for an infrared ray (infrared lens having fixed focal length) in Example 1 of the present invention showing spherical aberration (3 micron-meters, 4 micron-meters, 5 micron-meters), astigmatic aberration (the sagittal direction and the tangential direction), and distortion.

FIG. 2 shows a lateral aberration diagram of the optical system for an infrared ray with Typical Numerical Values 1, and FIG. 3 shows spherical aberration, astigmatic aberration, and distortion of the optical system for an infrared ray with Typical Numerical Values 1. In the lateral aberration diagram in FIG. 2, the horizontal axis represents a distance from a main light beam in a pupil plane, the top represents lateral aberration at an on-axis focusing point, the center represents lateral aberration at a position with a half angle of a maximum image viewing angle, and the bottom represents lateral aberration at an focusing point of maximum focusing height. In the spherical aberration in FIG. 3, the vertical axis represents an F-number (indicated by FNO in the diagram), and the characteristics with light beams of various wavelengths (in FIG. 3, light beams of 3 micron-meters, 4 micron-meters, and 5 micron-meters wavelength) are shown. In the astigmatic aberration in FIG. 3, the vertical axis represents a half image viewing angle (indicated by ω in FIG. 3), and the characteristics at a sagittal plane (indicated by S in the diagram) and a tangential plane (indicated by T in the diagram) are shown. In the distortion in FIG. 3, the vertical axis represents a half image viewing angle (indicated by ω in the diagram). The same applies on FIGS. 5, 6, 8, 9, 11, 12, 14, 15, 17, 18, 20, and 21.

Example 2

Figure 4:
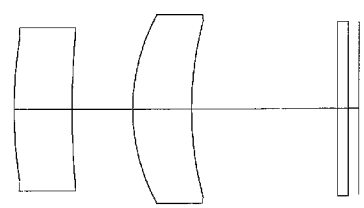
FIG. 4 shows an optical sectional view exemplifying a lens configuration of an optical system for an infrared ray (infrared lens having fixed focal length) in Example 2 of the present invention.

An optical system for an infrared ray in Example 2 is constituted by a first lens having negative refractive power and a second lens having positive refractive power and a cover glass is arranged at closest to a focusing plane the same as the optical system for an infrared ray in Example 1. In Example 2, the first lens is made of ZnSe, the second lens is made of chalcogenide, and the cover glass is made of germanium. A specific lens configuration is shown in FIG. 4. In Examples 1 to 7, the cover glasses employed are made of germanium and have the same thickness. Since the respective optical sectional views (FIGS. 1, 4, 7, 10, 13, 17, and 20) showing the lens configurations of the optical systems for an infrared ray of Examples are drawn in appropriately reduced scale according to the lens diameters of the first lens and the second lens. So, even the thickness of the cover glasses are different depending on the reduced scales of the drawings, thickness of all the cover glasses are the same.

Figure 5:
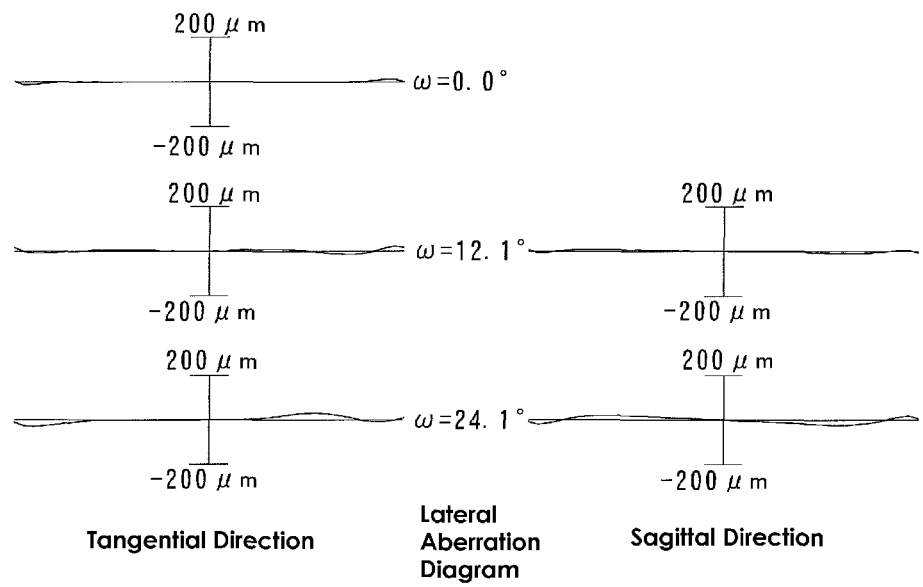
FIG. 5 shows a lateral aberration diagram in a tangential direction and a sagittal direction of the optical system for an infrared ray in Example 2 of the present invention showing characteristics at ω of 0.0°, 12.1°, and 24.1° from the top.
Figure 6:
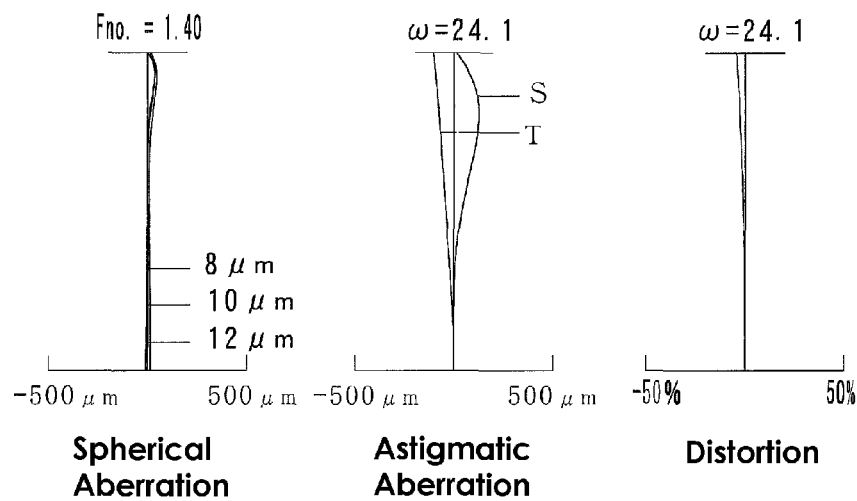
FIG. 6 shows aberration diagrams of the optical system for an infrared ray (infrared lens having fixed focal length) in Example 2 of the present invention showing spherical aberration (8 micron-meters, 10 micron-meters, 12 micron-meters), astigmatic aberration (the sagittal direction and the tangential direction), and distortion.

In Example 2, Typical Numerical Values 2 applied specific numerical values on the lens data of the optical system for an infrared ray is shown in Table 4, Table 5 shows an aspherical surface coefficient, and Table 6 shows a diffractive surface coefficient. In Table 4, "C" in the column of the lens material indicates chalcogenide (the same applies hereinafter). FIG. 5 shows a lateral aberration diagram of the optical system for an infrared ray with Typical Numerical Values 2, and FIG. 6 shows spherical aberration, astigmatic aberration, and distortion of the optical system for an infrared ray with Typical Numerical Values 2.

Table 22 shows the focal length of the entire system (f), the F-number (Fno), the image viewing angle (2ω), the focal length of the first lens ($f_1$), the focal length of the second lens ($f_2$), and the values of the conditional expressions (1) to (3) in Example 2.

TABLE 4

| Surface No. | | Radius of Curvature | Gap | Refractive Index | Lens Material |
|---|---|---|---|---|---|
| 1 | AS | 13.511 | 2.750 | 2.40644 | ZnSe |
| 2 | AS.DOE | 11.534 | 2.880 | | |
| 3 | AS | 9.291 | 2.790 | 2.49437 | C |
| 4 | AS.DOE | 26.368 | 5.980 | | |
| 5 | | Infinity | 1 | 4.01628 | Ge |
| 6 | | Infinity | 1 | | |

Note that the refractive index are a value with a light beam of 10 micron-meters wavelength.

TABLE 5

| Aspherical Surface Coefficient | S1 | S2 | S3 | S4 |
|---|---|---|---|---|
| K | 0.714 | 4.039 | 0 | 0 |
| A2 | −8.473702E−04 | −2.165539E−03 | 3.189925E−04 | 1.657123E−03 |
| A4 | −3.786401E−05 | −4.176998E−05 | −3.191373E−06 | −5.656647E−05 |
| A6 | | 1.316344E−06 | −1.024690E−06 | −1.401276E−07 |
| A8 | | −3.244344E−08 | | |

TABLE 6

| Diffractive Surface Coefficient | S2 | S4 |
|---|---|---|
| P2 | −1.1858225E+00 | 3.2529816E−01 |
| P4 | 2.9496200E−01 | −4.6232853E−01 |
| P6 | −4.2539415E−02 | 8.0926349E−02 |
| P8 | 2.6205217E−03 | −4.7566177E−03 |
| P10 | −6.2217893E−05 | 9.6865700E−05 |

Example 3

Figure 7:
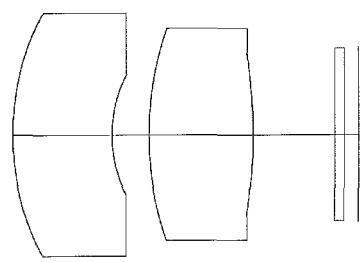
FIG. 7 shows an optical sectional view exemplifying a lens configuration of an optical system for an infrared ray (infrared lens having fixed focal length) in Example 3 of the present invention.

An optical system for an infrared ray in Example 3 is constituted by a first lens having negative refractive power and a second lens having positive refractive power and a cover glass is arranged at closest to a focusing plane the same as the optical system for an infrared ray in Example 1. In Example 3, both the first lens and the second lens are made of ZnSe. A specific lens configuration is shown in FIG. 7.

Figure 8:
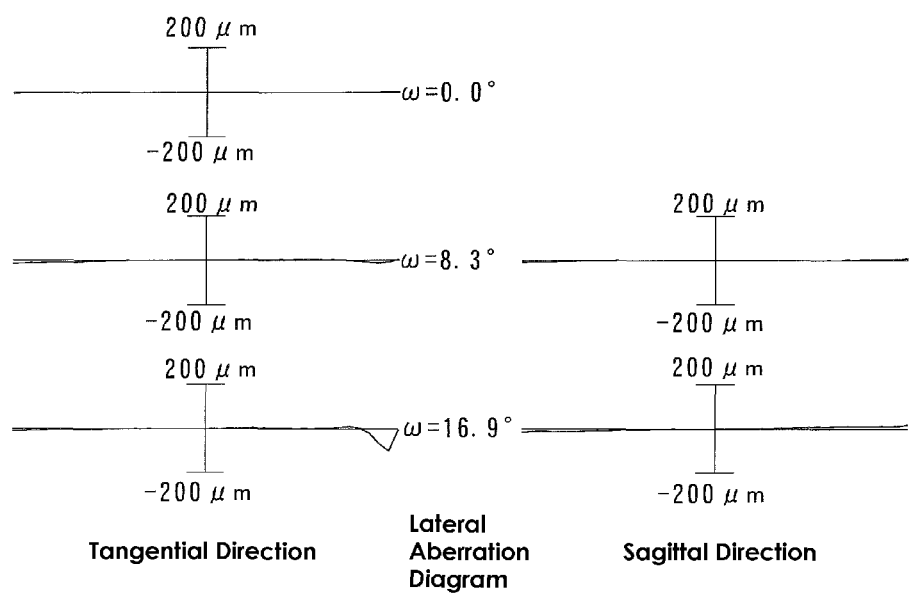
FIG. 8 shows a lateral aberration diagram in a tangential direction and a sagittal direction of the optical system for an infrared ray in Example 3 of the present invention showing characteristics at ω of 0.0°, 8.3°, and 16.9° from the top.
Figure 9:
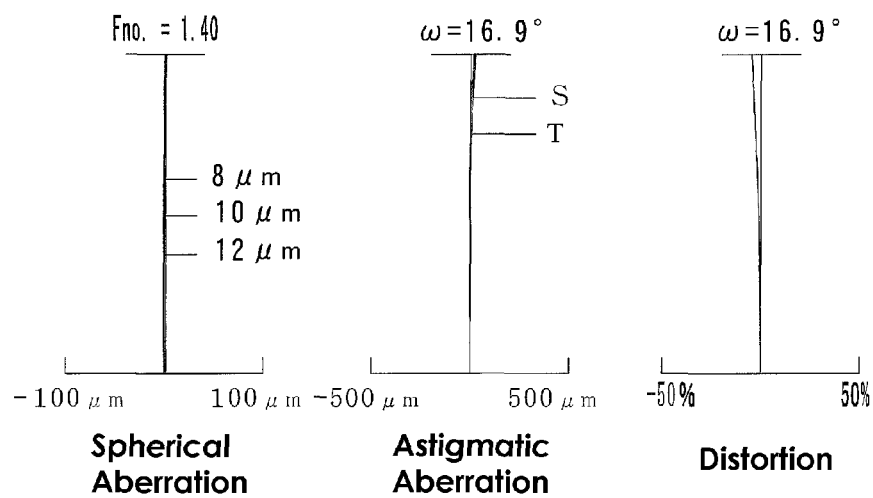
FIG. 9 shows aberration diagrams of the optical system for an infrared ray (infrared lens having fixed focal length) in Example 3 of the present invention showing spherical aberration (8 micron-meters, 10 micron-meters, 12 micron-meters), astigmatic aberration (the sagittal direction and the tangential direction), and distortion.

In Example 3, Typical Numerical Values 3 applied specific numerical values on the lens data of the optical system for an infrared ray is shown in Table 7, Table 8 shows an aspherical surface coefficient, and Table 9 shows a diffractive surface coefficient. FIG. 8 shows a lateral aberration diagram of the optical system for an infrared ray with Typical Numerical Values 3, and FIG. 9 shows spherical aberration, astigmatic aberration, and distortion of the optical system for an infrared ray with Typical Numerical Values 3.

Table 22 shows the focal length of the entire system (f), the F-number (Fno), and the image viewing angle (2ω), the focal length of the first lens ($f_1$), the focal length of the second lens ($f_2$), and the values of the conditional expressions (1) to (3) in Example 3.

TABLE 7

| Surface No. | | Radius of Curvature | Gap | Refractive Index | Lens Material |
|---|---|---|---|---|---|
| 1 | AS | 6.993 | 5.160 | 2.40644 | ZnSe |
| 2 | AS.DOE | 3.596 | 1.929 | | |
| 3 | AS.DOE | 11.011 | 5.500 | 2.40644 | ZnSe |
| 4 | AS.DOE | −17.251 | 3.460 | | |
| 5 | | Infinity | 1 | 4.01628 | Ge |
| 6 | | Infinity | 1 | | |

Note that the refractive index are a value with a light beam of 10 micron-meters wavelength.

TABLE 8

| Aspherical Surface Coefficient | S1 | S2 | S3 | S4 |
|---|---|---|---|---|
| k | −4.135 | −0.766 | 4.644 | −129.567 |
| A2 | 1.422488E−03 | 2.338702E−03 | 4.132051E−04 | −2.054359E−03 |
| A4 | −3.441104E−05 | −1.012575E−04 | −9.054609E−05 | 1.865910E−04 |
| A6 | 9.324362E−07 | −1.321079E−07 | 1.175739E−05 | −1.414279E−06 |
| A8 | −1.822628E−08 | 9.627085E−07 | −4.931823E−07 | −1.611547E−06 |

TABLE 9

| Diffractive Surface Coefficient | S2 | S3 | S4 |
|---|---|---|---|
| P2 | 8.4432470E+00 | −1.4173964E+01 | 8.1902249E+00 |
| P4 | 1.4340492E−01 | −5.0185439E−03 | −3.5836075E−01 |
| P6 | 2.0046833E−01 | −1.1155780E−01 | 4.0993640E−01 |
| P8 | −2.2046240E−02 | 1.2602490E−20 | −7.2291510E−02 |
| P10 | −2.5866085E−04 | −4.3033039E−04 | 6.8809725E−03 |

Example 4

Figure 10:
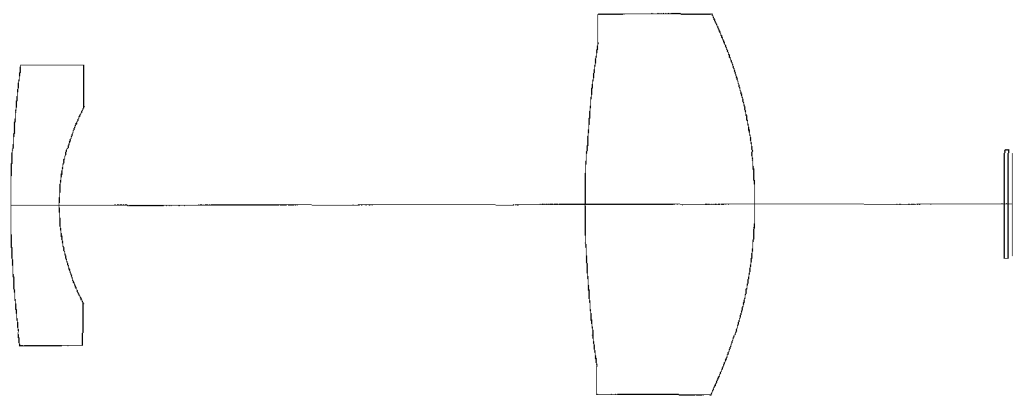
FIG. 10 shows an optical sectional view exemplifying a lens configuration of an optical system for an infrared ray (infrared lens having fixed focal length) in Example 4 of the present invention.

An optical system for an infrared ray in Example 4 is constituted by a first lens having negative refractive power and a second lens having positive refractive power and a cover glass is arranged at closest to a focusing plane the same as the optical system for an infrared ray in Example 1. In Example 4, the first lens is made of germanium, and the second lens is made of chalcogenide. A specific lens configuration is shown in FIG. 10.

Figure 11:
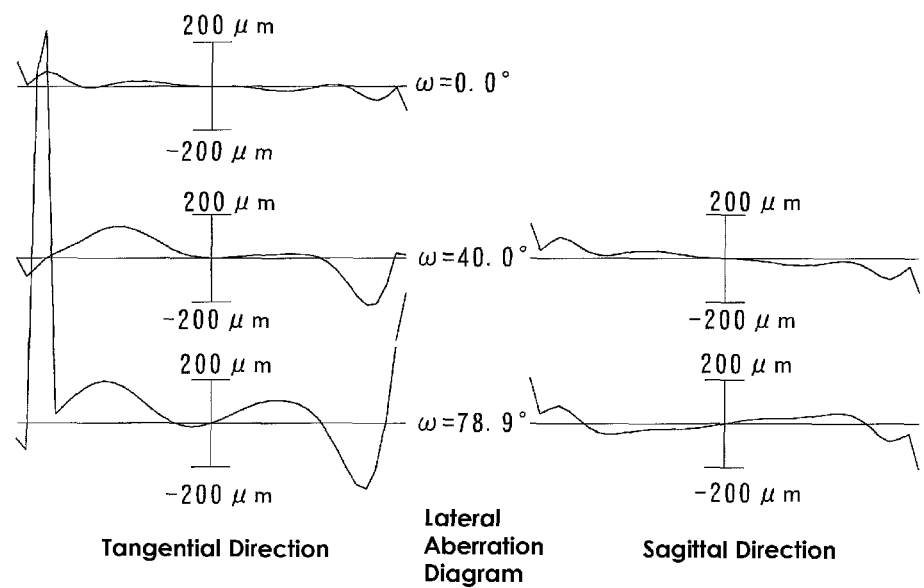
FIG. 11 shows a lateral aberration diagram in a tangential direction and a sagittal direction of the optical system for an infrared ray in Example 4 of the present invention showing characteristics at ω of 0.0°, 40.0°, and 78.9° from the top.
Figure 12:
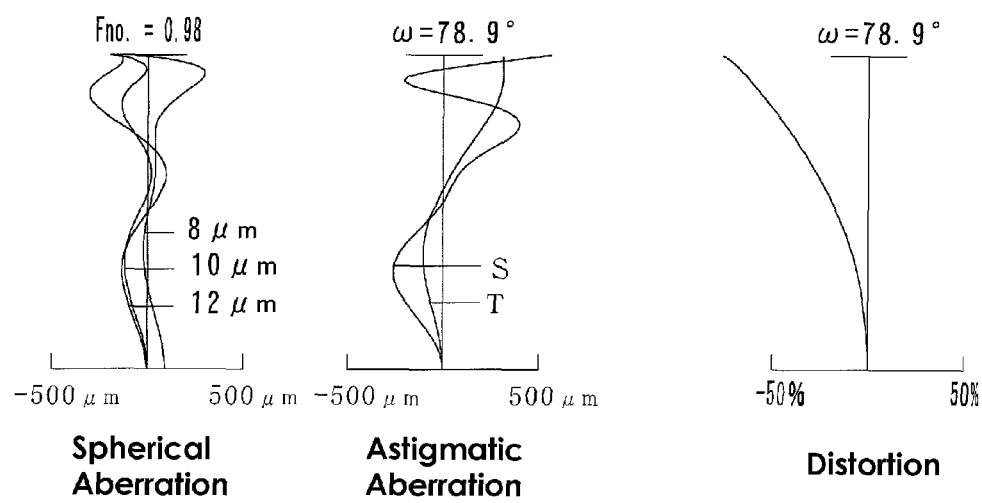
FIG. 12 shows aberration diagrams of the optical system for an infrared ray (infrared lens having fixed focal length) in Example 4 of the present invention showing spherical aberration (8 micron-meters, 10 micron-meters, 12 micron-meters), astigmatic aberration (the sagittal direction and the tangential direction), and distortion.

In Example 4, Typical Numerical Values 4 applied specific numerical values on the lens data of the optical system for an infrared ray is shown in Table 10, Table 11 shows an aspherical surface coefficient, and Table 12 shows a diffractive surface coefficient. FIG. 11 shows a lateral aberration diagram of the optical system for an infrared ray with Typical Numerical Values 4, and FIG. 12 shows spherical aberration, astigmatic aberration, and distortion of the optical system for an infrared ray with Typical Numerical Values 4.

Table 22 shows the focal length of the entire system (f), the F-number (Fno), and the image viewing angle (2ω), the focal length of the first lens ($f_1$), the focal length of the second lens ($f_2$), and the values of the conditional expressions (1) to (3) in Example 4.

TABLE 10

| Surface No. | | Radius of Curvature | Gap | Refractive Index | Lens Material |
|---|---|---|---|---|---|
| 1 | AS | −49.010 | 12.190 | 4.01628 | Ge |
| 2 | AS | −203.321 | 131.784 | | |
| 3 | AS.DOE | 138.653 | 42.667 | 2.49437 | C |
| 4 | AS | −144.820 | 62.424 | | |
| 5 | | Infinity | 1 | 4.01628 | Ge |
| 6 | | Infinity | 1 | | |

Note that the refractive index are a value with a light beam of 10 micron-meters wavelength.

TABLE 11

| Aspherical Surface Coefficient | S1 | S2 | S3 | S4 |
|---|---|---|---|---|
| K | 0 | 0 | 0 | 0 |
| A2 | 2.405432E−05 | 1.467769E−05 | −4.016186E−07 | 1.947692E−07 |
| A4 | −1.983832E−08 | 1.169768E−08 | −1.821501E−10 | −5.030426E−10 |
| A6 | 1.092429E−11 | 1.455664E−11 | −1.279867E−13 | 1.240506E−13 |
| A8 | −2.644486E−15 | −3.170598E−14 | −7.924930E−18 | −1.712254E−17 |

TABLE 12

| Diffractive Surface Coefficient | S3 |
|---|---|
| P2 | −1.4054566E−01 |
| P4 | −5.0865540E−05 |
| P6 | 2.4653828E−07 |
| P8 | −2.8231091E−10 |
| P10 | 8.8784585E−14 |

TABLE 13

| Surface No. | | Radius of Curvature | Gap | Refractive Index | Lens Material |
|---|---|---|---|---|---|
| 1 | AS | 12.814 | 2.110 | 2.20025 | ZnS |
| 2 | AS.DOE | 9.076 | 6.064 | | |
| 3 | AS.DOE | −18.241 | 3.830 | 2.49437 | C |
| 4 | AS | −8.794 | 11.239 | | |
| 5 | | Infinity | 1 | 4.01628 | Ge |
| 6 | | Infinity | 1 | | |

Note that the refractive index are a value with a light beam of 10 micron-meters wavelength.

TABLE 14

| Aspherical Surface Coefficient | S1 | S2 | S3 | S4 |
|---|---|---|---|---|
| K | −17.924 | 3.85 | −9.292 | −0.666 |
| A2 | 1.846881E−03 | 8.478105E−04 | −6.248165E−04 | −2.517575E−04 |
| A4 | −2.131304E−05 | 1.455284E−04 | 2.313007E−05 | 7.719959E−06 |
| A6 | 8.859381E−07 | −9.058068E−06 | −1.119973E−06 | −3.381771E−07 |
| A8 | −9.292218E−09 | 5.765218E−07 | 2.242778E−08 | 4.323760E−09 |

TABLE 15

| Diffractive Surface Coefficient | S2 | S3 |
|---|---|---|
| P2 | 2.8146174E−01 | −9.9641669E−01 |
| P4 | 3.2482298E−01 | 8.6885546E−03 |
| P6 | −5.8341975E−02 | −4.5084522E−04 |
| P8 | 4.5858840E−03 | 1.1936557E−05 |
| P10 | −1.2890823E−04 | −1.6369157E−07 |

Example 5

Figure 13:
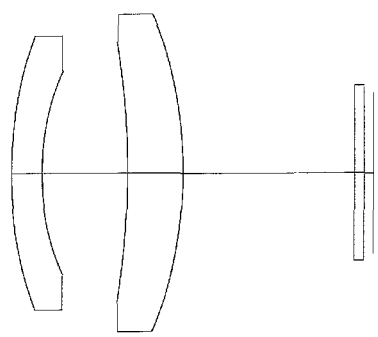
FIG. 13 shows an optical sectional view exemplifying a lens configuration of an optical system for an infrared ray (infrared lens having fixed focal length) in Example 5 of the present invention.

An optical system for an infrared ray in Example 5 is constituted by a first lens having negative refractive power and a second lens having positive refractive power and a cover glass is arranged at closest to a focusing plane the same as the optical system for an infrared ray in Example 1. In Example 5, the first lens is made of ZnS, and the second lens is made of chalcogenide. A specific lens configuration is shown in FIG. 13.

Figure 14:
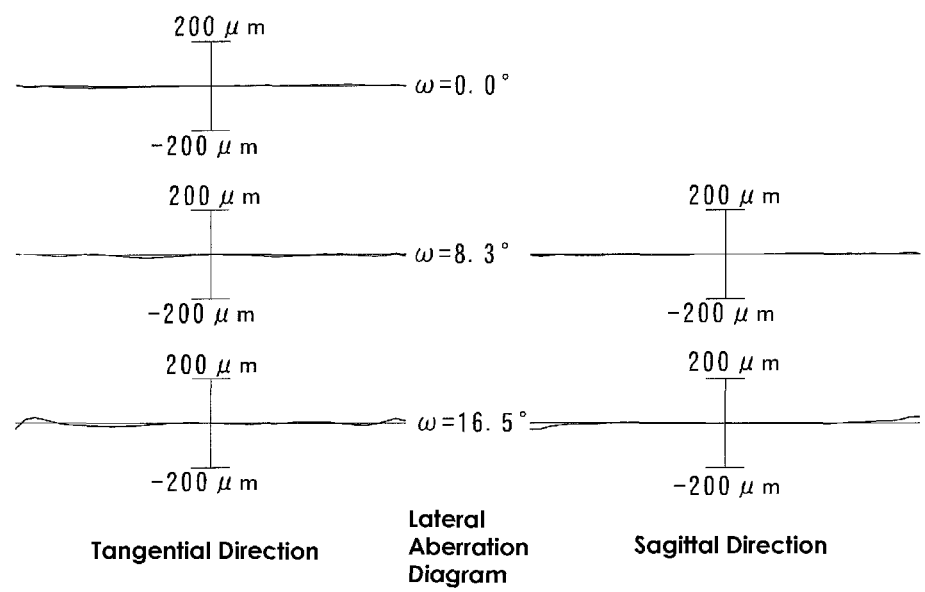
FIG. 14 shows a lateral aberration diagram in a tangential direction and a sagittal direction of the optical system for an infrared ray in Example 5 of the present invention showing characteristics at ω of 0.0°, 40.0°, and 78.9° from the top.
Figure 15:
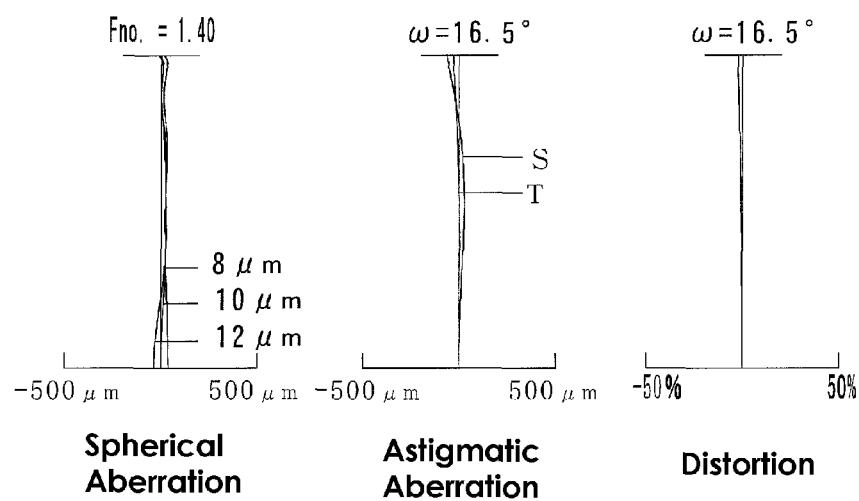
FIG. 15 shows aberration diagrams of the optical system for an infrared ray (infrared lens having fixed focal length) in Example 5 of the present invention showing spherical aberration (8 micron-meters, 10 micron-meters, 12 micron-meters), astigmatic aberration (the sagittal direction and the tangential direction), and distortion.

In Example 5, Typical Numerical Values 5 applied specific numerical values on the lens data of the optical system for an infrared ray is shown in Table 13, Table 14 shows an aspherical surface coefficient, and Table 15 shows a diffractive surface coefficient. FIG. 14 shows a lateral aberration diagram of the optical system for an infrared ray with Typical Numerical Values 5, and FIG. 15 shows spherical aberration, astigmatic aberration, and distortion of the optical system for an infrared ray with Typical Numerical Values 5.

Table 22 shows the focal length of the entire system (f), the F-number (Fno), and the image viewing angle (2ω), the focal length of the first lens ($f_1$), the focal length of the second lens ($f_2$), and the values of the conditional expressions (1) to (3) in Example 5.

Example 6

Figure 16:
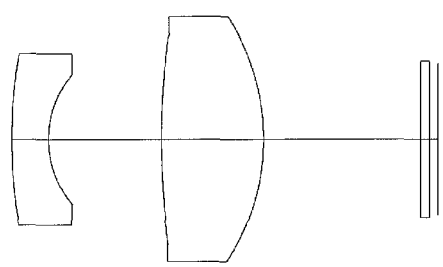
FIG. 16 shows an optical sectional view exemplifying a lens configuration of an optical system for an infrared ray (infrared lens having fixed focal length) in Example 6 of the present invention.

An optical system for an infrared ray in Example 6 is constituted by a first lens having negative refractive power and a second lens having positive refractive power and a cover glass is arranged at closest to a focusing plane the same as the optical system for an infrared ray in Example 1. In Example 6, both the first lens and the second lens are made of chalcogenide. A specific lens configuration is shown in FIG. 16.

Figure 17:
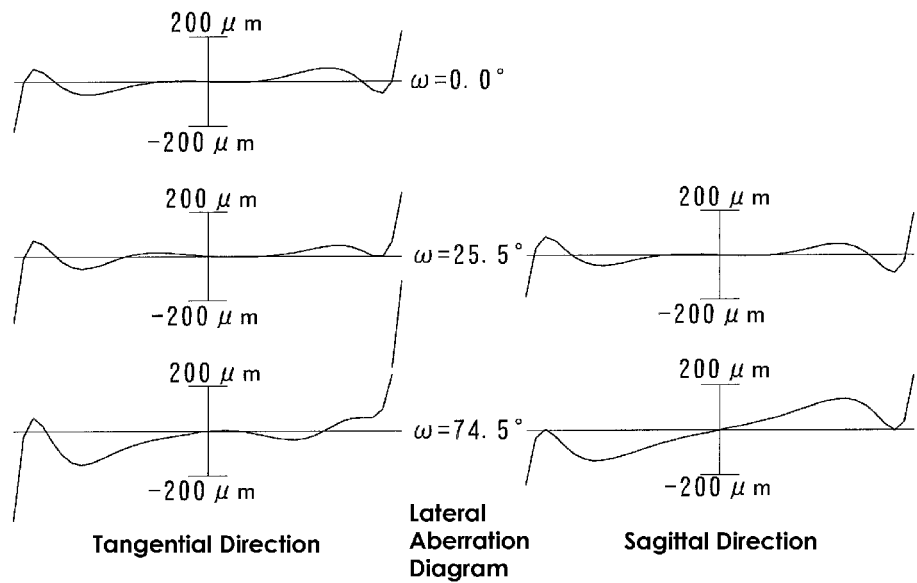
FIG. 17 shows a lateral aberration diagram in a tangential direction and a sagittal direction of the optical system for an infrared ray in Example 6 of the present invention showing characteristics at ω of 0.0°, 25.5°, and 74.5° from the top.
Figure 18:
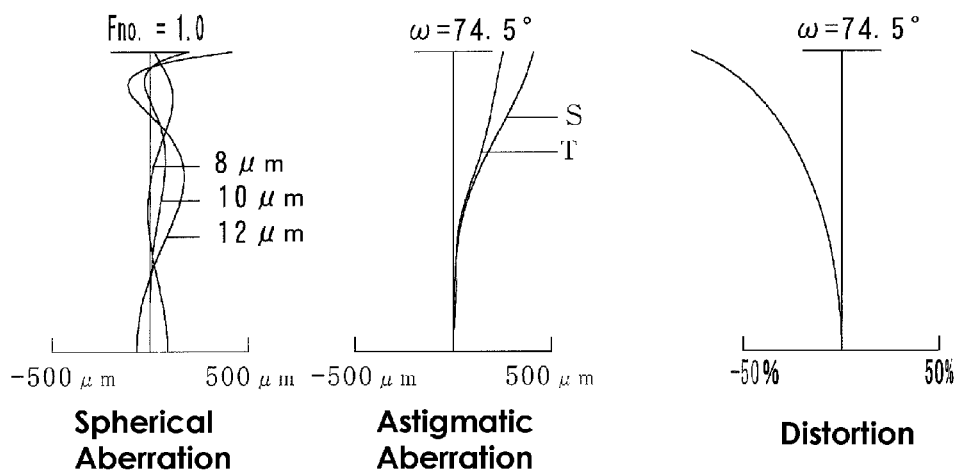
FIG. 18 shows aberration diagrams of the optical system for an infrared ray (infrared lens having fixed focal length) in Example 6 of the present invention showing spherical aberration (8 micron-meters, 10 micron-meters, 12 micron-meters), astigmatic aberration (the sagittal direction and the tangential direction), and distortion.

In Example 6, Typical Numerical Values 6 applied specific numerical values on the lens data of the optical system for an infrared ray is shown in Table 16, Table 17 shows an aspherical surface coefficient, and Table 18 shows a diffractive surface coefficient. FIG. 17 shows a lateral aberration diagram of the optical system for an infrared ray with Typical Numerical Values 6, and FIG. 18 shows spherical aberration, astigmatic aberration, and distortion of the optical system for an infrared ray with Typical Numerical Values 6.

Table 22 shows the focal length of the entire system (f), the F-number (Fno), and the image viewing angle (2ω), the focal length of the first lens ($f_1$), the focal length of the second lens ($f_2$), and the values of the conditional expressions (1) to (3) in Example 6.

TABLE 16

| Surface No. | | Radius of Curvature | Gap | Refractive Index | Lens Material |
|---|---|---|---|---|---|
| 1 | AS | 28.347 | 4.334 | 2.49437 | C |
| 2 | AS.DOE | 11.149 | 13.390 | | |
| 3 | AS.DOE | 61.537 | 12.193 | 2.49437 | C |
| 4 | AS | −24.651 | 18.591 | | |
| 5 | | Infinity | 1 | 4.01628 | Ge |
| 6 | | Infinity | 1 | | |

Note that the refractive index are a value with a light beam of 10 micron-meters wavelength.

TABLE 17

| Aspherical Surface Coefficient | S1 | S2 | S3 | S4 |
|---|---|---|---|---|
| K | −13.604 | −1.035 | 4.308 | −4.798 |
| A2 | −1.722752E−05 | 1.970783E−05 | 1.735770E−06 | −2.400893E−05 |
| A4 | −3.679605E−07 | 3.121549E−07 | −4.298762E−07 | 1.521786E−09 |
| A6 | 9.063149E−10 | 9.702448E−09 | 2.654003E−09 | 3.147622E−10 |
| A8 | −1.504275E−12 | −8.186962E−11 | −5.232515E−12 | −1.078747E−12 |

TABLE 18

| Diffractive Surface Coefficient | S2 | S3 |
|---|---|---|
| P2 | 1.3418878E+00 | −1.1458332E+00 |
| P4 | −2.4956530E−02 | 2.2997919E−02 |
| P6 | 5.1735655E−04 | −2.8341699E−04 |
| P8 | −7.8495779E−06 | 1.0564200E−06 |
| P10 | 1.0483853E−07 | |

Example 7

Figure 19:
FIG. 19 shows an optical sectional view exemplifying a lens configuration of an optical system for an infrared ray (infrared lens having fixed focal length) in Example 7 of the present invention.

An optical system for an infrared ray in Example 7 is constituted by a first lens having negative refractive power and a second lens having positive refractive power and a cover glass is arranged at closest to a focusing plane the same as the optical system for an infrared ray in Example 1. In Example 7, the first lens is made of silicon, and the second lens is made of chalcogenide. A specific lens configuration is shown in FIG. 19.

Figure 20:
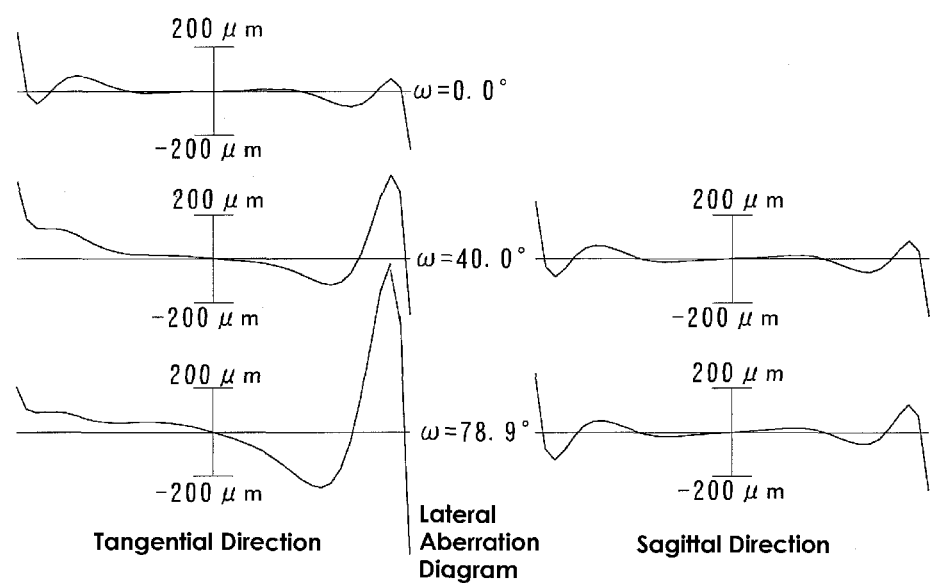
FIG. 20 shows a lateral aberration diagram in a tangential direction and a sagittal direction of the optical system for an infrared ray in Example 7 of the present invention showing characteristics at ω of 0.0°, 40.0°, and 78.9° from the top.
Figure 21:
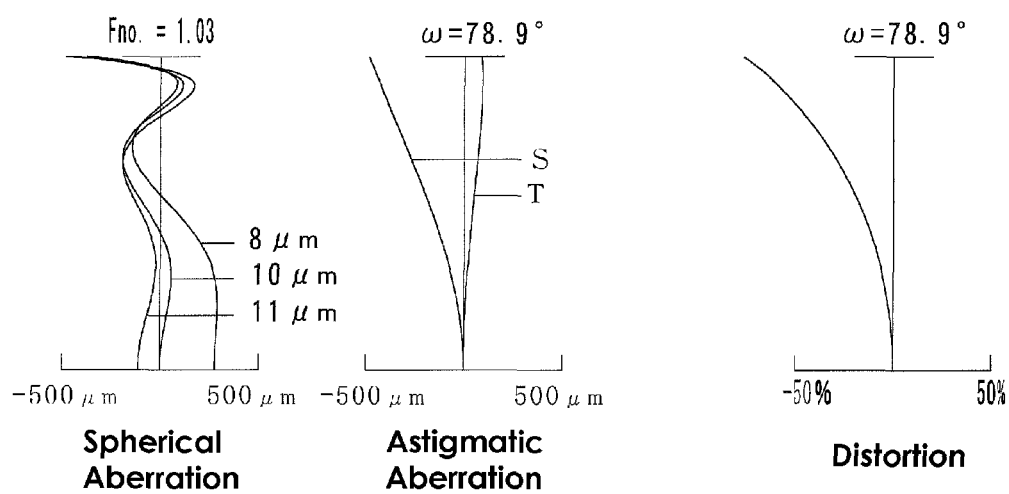
FIG. 21 shows aberration diagrams of the optical system for an infrared ray (infrared lens having fixed focal length) in Example 7 of the present invention showing spherical aberration (8 micron-meters, 10 micron-meters, 12 micron-meters), astigmatic aberration (the sagittal direction and the tangential direction), and distortion.

In Example 7, Typical Numerical Values 7 applied specific numerical values on the lens data of the optical system for an infrared ray is shown in Table 19, Table 20 shows an aspherical surface coefficient, and Table 21 shows a diffractive surface coefficient. Moreover, FIG. 20 shows a lateral aberration diagram of the optical system for an infrared ray with Typical Numerical Values 7, and FIG. 21 shows spherical aberration, astigmatic aberration, and distortion of the optical system for an infrared ray with Typical Numerical Values 7.

Table 22 shows the focal length of the entire system (f), the F-number (Fno), and the image viewing angle (2ω), the focal length of the first lens ($f_1$), the focal length of the second lens ($f_2$), and the values of the conditional expressions (1) to (3) in Example 7.

TABLE 19

| Surface No. | | Radius of Curvature | Gap | Refractive Index | Lens Material |
|---|---|---|---|---|---|
| 1 | | 83.569 | 11.990 | 3.41776 | Si |
| 2 | | 29.839 | 131.154 | | |
| 3 | AS.DOE | 140.288 | 41.967 | 2.49437 | C |
| 4 | AS | −133.704 | 59.998 | | |
| 5 | | Infinity | 1 | 4.01628 | Ge |
| 6 | | Infinity | 1 | | |

Note that the refractive index are a value with a light beam of 10 micron-meters wavelength.

TABLE 20

| Aspherical Surface Coefficient | S3 | S4 |
|---|---|---|
| K | 0 | 0 |
| A2 | −8.256691E−07 | −3.854818E−07 |
| A4 | −1.978562E−10 | −2.243651E−10 |
| A6 | −1.436988E−13 | 6.071865E−14 |
| A8 | −9.197118E−18 | −1.191934E−17 |

TABLE 21

| Diffractive Surface Coefficient | S3 |
|---|---|
| P2 | −2.1452435E−01 |
| P4 | 1.1830945E−04 |
| P6 | −1.4008137E−07 |
| P8 | 1.4323831E−10 |
| P10 | −6.2284031E−04 |

TABLE 22

| | Example 1 | Example 2 | Example 3 | Example 4 | Example 5 | Example 6 | Example 7 |
|---|---|---|---|---|---|---|---|
| Entire Focal Length: f | 9.95 | 10 | 10 | 10 | 10 | 10 | 10 |
| F-Number: Fno | 1.44 | 1.4 | 1.4 | 0.98 | 1.4 | 1 | 1.03 |
| Image Viewing Angle: 2ω [deg.] | 158 | 48.1 | 33.8 | 157.8 | 33 | 149 | 157.8 |
| First Lens Focal Length: f1 | −23.14 | −4.33E+09 | −27.25 | −22.85 | −36.31 | −13.71 | −22.78 |
| Second Lens Focal Length: f2 | 40.64 | 8.81 | 4.84 | 51.12 | 8.95 | 12.46 | 49.07 |
| Conditional Expression (1) | −2.33 | −4.33E+08 | −2.73 | −2.29 | −3.63 | −1.37 | −2.28 |
| Conditional Expression (2) | 4.08 | 0.88 | 0.48 | 5.11 | 0.90 | 1.25 | 4.91 |
| Conditional Expression (3) | 2.84 | 0.63 | 0.35 | 5.22 | 0.64 | 1.25 | 4.76 |

INDUSTRIAL APPLICABILITY

According to the present invention, the optical system for an infrared ray which can provide a bright image and is applicable among wide-angle to medium-telephoto fixed focal length lenses. The optical system for an infrared ray is suitable for applications including surveillance cameras and infrared thermography.

The invention claimed is:

1. An optical system for an infrared ray consists of a first lens having negative refractive power and a second lens having positive refractive power, these are arranged sequentially from an object side and a diffractive optical element disposed on at least one surface of the first and second lenses;
   wherein the first lens comprises a convex surface facing the object side;
   wherein both the first lens and the second lens are made of an infrared transmitting material that transmits a light beam in an infrared wavelength range of 3 micron-meters or more to 14 micron-meters or less, and at least one of the lenses is made of an infrared transmitting material excluding germanium; and
   wherein the optical system satisfies a following expression (2):

$$0.35 < f_2/f < 5.5 \quad (2)$$

where $f_2$ is a focal length of the second lens and f is a focal length of the entire optical system for an infrared ray.

2. The optical system for an infrared ray according to claim 1, satisfying a following expression (1):

$$f_1/f < -1.0 \quad (1)$$

where $f_1$ is a focal length of the first lens and f is a focal length of the entire optical system for an infrared ray.

3. The optical system for an infrared ray according to claim 1, satisfying a following expression (3):

$$(f_2/f)/Fno < 5.6 \quad (3)$$

where $f_2$ is the focal length of the second lens, f is the focal length of the entire optical system for an infrared ray, and Fno is an F-number of the entire optical system for an infrared ray.

* * * * *